United States Patent
Abbott et al.

(10) Patent No.: US 11,467,395 B2
(45) Date of Patent: Oct. 11, 2022

(54) HIGH-RELIABILITY ULTRA-FAST MECHANICAL SHUTTER

(71) Applicants: California Institute of Technology, Pasadena, CA (US); Massachusetts Institute of Technology, Cambridge, MA (US)

(72) Inventors: Richard Abbott, Altadena, CA (US); Peter Fritschel, Cambridge, MA (US); Kavya Sreedhar, Oakland, CA (US)

(73) Assignees: CALIFORNIA INSTITUTE OF TECHNOLOGY, Pasadena, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 277 days.

(21) Appl. No.: 16/900,615

(22) Filed: Jun. 12, 2020

(65) Prior Publication Data

US 2020/0393668 A1 Dec. 17, 2020

Related U.S. Application Data

(60) Provisional application No. 62/860,979, filed on Jun. 13, 2019.

(51) Int. Cl.
*H02K 41/03* (2006.01)
*G02B 26/08* (2006.01)
*H02K 41/035* (2006.01)

(52) U.S. Cl.
CPC ....... *G02B 26/085* (2013.01); *H02K 41/0356* (2013.01)

(58) Field of Classification Search
CPC .... H02K 41/00; H02K 41/03; H02K 41/0356; G02B 26/00; G02B 26/007; G02B 26/02; G02B 26/04; G02B 26/08; G02B 26/0833; G02B 26/0858; G02B 5/00; G02B 5/005; G02B 7/1821
See application file for complete search history.

(56) References Cited

U.S. PATENT DOCUMENTS

| | | | | |
|---|---|---|---|---|
| 5,136,558 A | * | 8/1992 | Getreuer | G11B 7/0935 720/683 |
| 6,118,569 A | * | 9/2000 | Plesko | G02B 26/101 359/201.1 |
| 10,036,885 B2 | | 7/2018 | Abbott et al. | |

\* cited by examiner

*Primary Examiner* — Tran N Nguyen
(74) *Attorney, Agent, or Firm* — Gates & Cooper LLP

(57) ABSTRACT

An electro-mechanical device includes a payload of a magnet affixed to a mirror, and a coil assembly. The coil assembly has a body with wound electrically conducting wires and a payload aperture through which the payload travels. When voltage is applied to the coil assembly, current through the coil assembly generates a magnetic field resulting in a net upward force on the magnet that accelerates the payload to travel upward through the payload aperture for the mirror to block an optical pulse. As the magnet travels through the payload aperture, due to a magnetization direction of the magnet and a magnetic field in an upper portion of the coil assembly, the magnet experiences a net deceleration force that arrests the payload.

14 Claims, 5 Drawing Sheets

HIGH-RELIABILITY ULTRA-FAST MECHANICAL SHUTTER

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/860,979, filed on Jun. 13, 2019, with inventor(s) Richard Abbott, Peter Fritschel, and Kavya Sreedhar, entitled "High-Reliability Ultra-Fast Mechanical Shutter,".

This application is related to the following commonly-assigned patent application, which application is incorporated by reference herein:

U.S. Pat. No. 10,036,885, filed on May 13, 2015 and issued on Jul. 31, 2018, with inventor(s) Richard Abbott and Peter Fritschel, entitled "Ultra-Fast Mechanical Shutter".

STATEMENT REGARDING FEDERALLY SPONSORED RESEARCH AND DEVELOPMENT

The invention was made with Government support under Grant No. PHY1764464 awarded by the National Science Foundation. The government has certain rights in the invention.

BACKGROUND OF THE INVENTION

1. Field of the Invention

The present invention relates generally to mechanical shutters, and in particular, to a method, system, apparatus, and article of manufacture for ultra-fast electro-mechanical shutters.

2. Description of the Related Art

High-speed electro-mechanical shutters are utilized in a variety of precision devices for scientific research and industrial products. For example, products may include optical beam combiners and shutters, high-power LEDs, interferometers, imaging spectrometers, etc. Some prior art shutter devices (e.g., the ultra-fast mechanical shutter described in U.S. Pat. No. 10,036,885) include a mirror (to reflect optical beams such as laser light) that is attached to a coil consisting of windings of electrical wires where the coil is within the magnetic field of a set of magnets. When the current is applied to the coil, the coil and attached mirror move relative to the magnets, and the movement of the mirror can allow blocking of an optical beam. Using a specific resistance, the movement of the coil can be controlled and a backup mechanical stop mechanism may be used to arrest the movement. Accordingly, prior art systems consist of a moving coil that requires electrical attachment. However, the use of a required electrical attachment limits the lifetime of such shutter devices. More specifically, prior art devices may have a failure mode associated with wire fatigue caused by repeated flexure of the coil attachment wires.

Due to the limitations of the prior art devices, it is desirable to have a system that does not require a moving coil with an electrical attachment, yet achieves desired performance specifications (e.g., critical or otherwise). Further, it is desirable to have a device that is physically smaller, cheaper to build, and more reliable than the prior art devices.

SUMMARY OF THE INVENTION

Embodiments of the invention provide a novel and robust solution compared to prior art electro-mechanical ultra-fast shutters due to a design that includes a moving payload consisting of magnets and a mirror with no wires attached, compared to the previous design comprised of a moving coil requiring electrical attachment. Accordingly, embodiments of the invention avoid the failure mode associated with wire fatigue caused by repeated flexure of the coil attachment wires. With a stationary coil, embodiments of the invention utilize a permanent magnet for the upward propulsion of the payload. Eddy current damping provided by copper interacting with the payload magnets is included to damp the oscillatory transient response of the payload. This newly designed system achieves desired performance specifications (e.g., the performance specifications described in U.S. Pat. No. 10,036,885), while being physically smaller, cheaper to build, and vastly more reliable.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
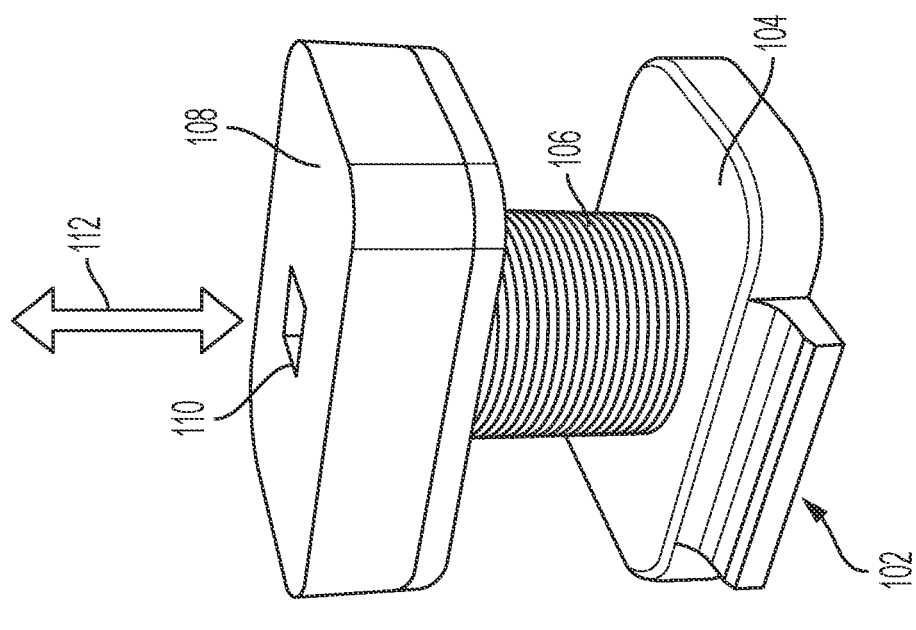
FIG. 1 illustrates a coil form assembly in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

An electro-mechanical device is described, comprising: a solenoidal coil, comprising windings of electrically conducting wire and a payload consisting of a single magnet configured to move linearly along the longitudinal axis of the electro-mechanical device.

The system specifically contains coils that consist of approximately 300 turns of 32 AWG (American Wire Gauge) polyimide-insulated copper wire, a rectangular NdFeB (Neodymium iron boron or "neo") grade-52 magnet, and a thin mirror, which can reflect optical beams such as laser light. The mirror is attached to the magnet payload and free to move along the longitudinal axis within the magnetic field of the coil. When a current is applied to the coil, the magnet and attached mirror can move axially relative to the coil, due to the electromagnetic interactions between the current in the coil and the magnet. The movement of the mirror can then allow blocking of an optical beam. In this way, an off/on shutter (e.g., an electro-mechanical shutter device) can be realized. With the addition of a copper damping element, dynamic control of the magnet and the attached mirror can be achieved. The system can be operated in air or in a vacuum environment over a wide range of temperature and cleanliness requirements.

Desired Performance Specifications

Embodiments of the invention attempt to comply with one or more desired performance specifications. Such performance specifications may include one or more of the following:

- LIGO Interferometer Use: the ability to protect photodiodes at the anti-symmetric (AS) port of a laser interferometer gravitational-wave observatory (LIGO) interferometer from being damaged by the optical pulse that occurs upon loss-of-lock, and the use in an electromagnetically actuated mechanical beam block/reflector in the LIGO interferometer;
- Shutter Speed Performance—shutter needs to be 90% closed within 1ms of being triggered, and 99.9% closed within 2 ms of being triggered;
- Shutter Aperture: In the "open" state, during low-noise operation of an interferometer, the shutter should be sufficiently clear of the beam to avoid noise from beam clipping. To avoid beam clipping noise, embodiments provide that any aperture can be 10 or more times the beam size ($1/e^2$ intensity), such that in the "open" state, the shutter's reflector can be at least 10 beam radii away from the beam center;
- Shutter Lifetime: A shutter having a minimum lifetime of 10,000 cycles (e.g., use/trigger 5 times a day for 5½ years);
- Vacuum Compatibility: The fast shutter is designed for service in an Ultra-High Vacuum (UHV) system (residual gas pressure of <10 nTorr) by avoiding trapped volumes and selection of appropriate low outgassing materials, such that the fast shutter assembly hydrocarbon outgassing rate, as measured by a mass spectrometer, is <4E-10 Torr-L/s.

DETAILED DESCRIPTION

FIG. 1 illustrates a coil form assembly in accordance with one or more embodiments of the invention. The physical assembly 100 of the system consists of a PEEK (polyether ether ketone) body. At the base of he PEEK body/core is a mounting foot 102 (to mount the assembly 100 to an object such that the relative position of the assembly 100 is stable) and a coil form 104. The coil assembly 106 consists of approximately three-hundred (300) turns of 32 AWG polyimide-insulated copper wire are wound around the PEEK body. The physical assembly 100 further includes a copper damping assembly 108 with a payload aperture 110 through which the payload is able to move/travel in the direction of the payload motion axis 112.

Figure 2:
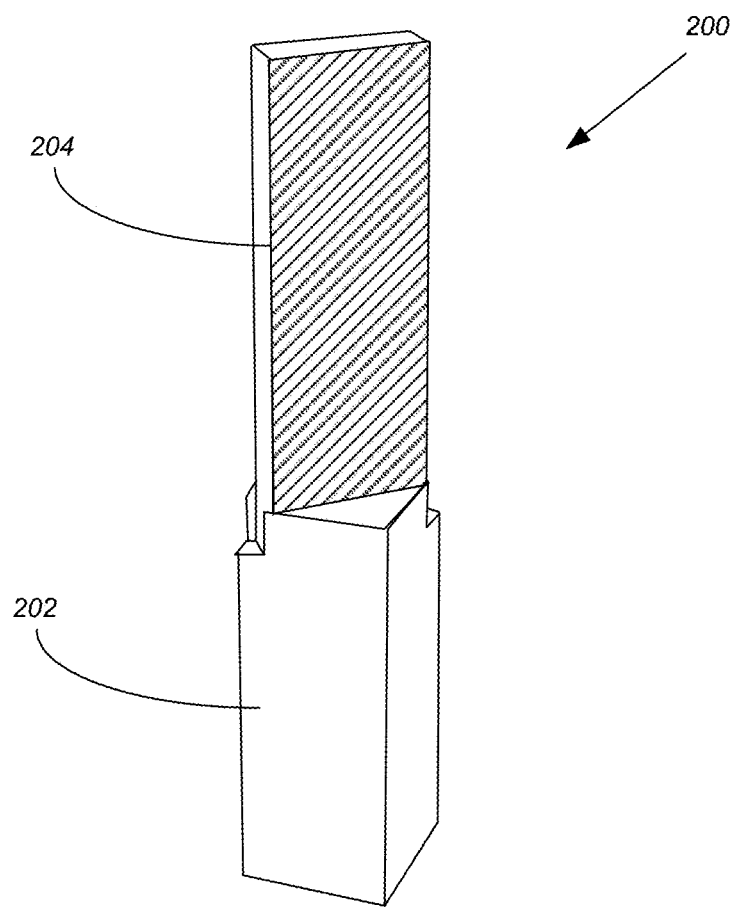
FIG. 2 illustrates the configuration of a payload in accordance with one or more embodiments of the invention.

FIG. 2 illustrates the configuration of a payload in accordance with one or more embodiments of the invention. The payload 200 consists of a magnet 202 (e.g., (NdFeB grade 52) and one thin mirror 204 affixed to the magnet 202. In one or more embodiments, the thickness of the mirror is such that the mass is minimized while still tolerating the high G-forces applied to the mirror.

Referring again to FIG. 1, when voltage is applied to the coil 106, the current through the coil 106 generates a magnetic field resulting in a net upward force on the magnet 202. This force activates the system 100 and accelerates the mirror 204 and magnet 202 payload 200 upward (along the motion aixs 112) (e.g., through and protruding out of the aperture 110 of the coil assembly [i.e., in the vertical axis within the magnetic field of the coils] and copper damping assembly 108) to block an optical pulse.

As the magnet 202 travels axially 112 beyond the center point of the coil 106, the magnet 202 experiences a net deceleration force due its magnetization direction and the direction of the magnetic field in the top/upper part of the coil 106. This decelerating force provides a non-contact means to arrest the magnet-mirror payload 200 without need of mechanical stops. This feature adds to the overall cleanliness of the system 112 as rubbing and associated particle generation is avoided. An additional copper damping assembly 108 (that is coupled/affixed to the coil assembly 106 and includes an extension of the payload aperture 110 [from the coil assembly] through which the payload travels). The copper damping assembly 108 includes a copper damping element that imposes eddy current damping to ensure arrest of the payload at a defined/desired stopping position. Thus, the copper damping assembly 108 eliminates excessive overshoot of the payload 200 that could result in any unblocking of the optical pulse due to the oscillatory nature of the undamped magnet 202. With copper damping elements (of the copper damping assembly 108) and oppositely polarized magnets (e.g., of the coil assembly 106 and the magnet 202 of the payload 200), dynamic control of the payload 200 including the attached mirror 204 can be achieved.

Figure 3:
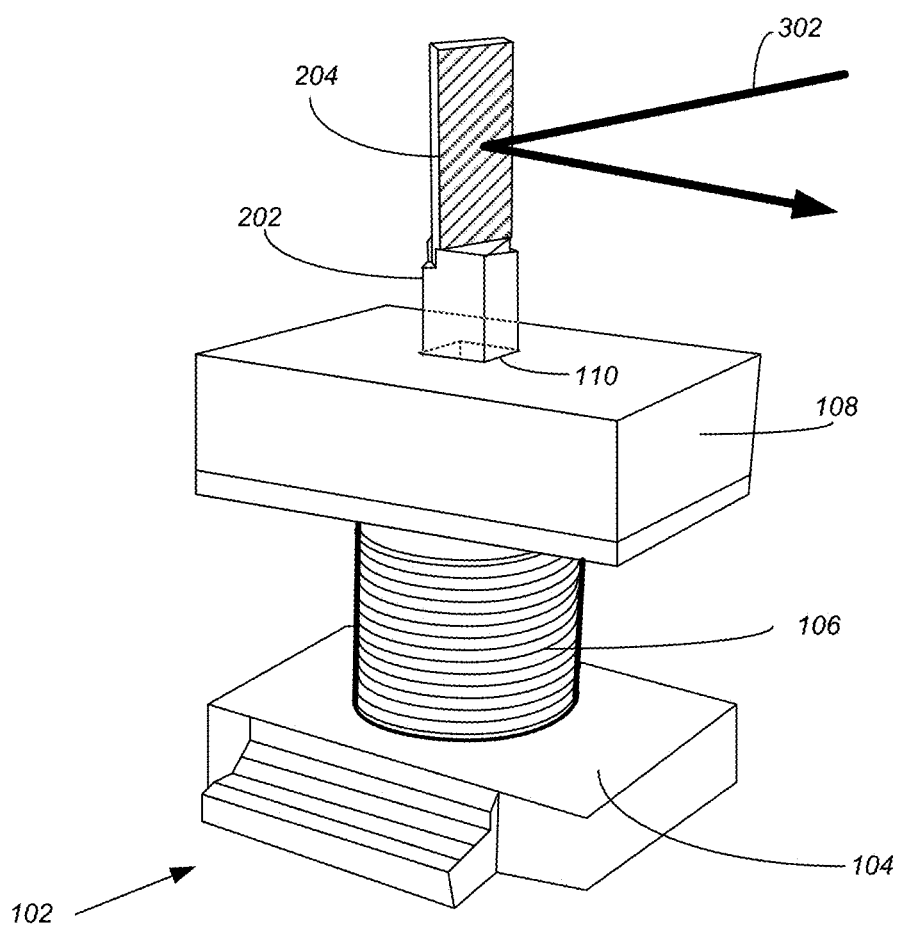
FIG. 3 illustrates a schematic of the payload protruding from aperture of the electro-mechanical device thereby blocking the optical pulse in accordance with one or more embodiments of the invention.

FIG. 3 illustrates a schematic of the payload 200 including magnet 202 and mirror 204 protruding from aperture 110 of the electro-mechanical device thereby blocking the optical pulse 302 in accordance with one or more embodiments of the invention. Although illustrated with the magnet 202 portion of the payload 200 protruding past the copper damping assembly 108, in one or more implementations, the copper damping assembly 108 may arrest the magnet 202 such that only the mirror 204 (or only a smaller portion of the magnet 202) protrudes form the aperture 110.

Figure 4:
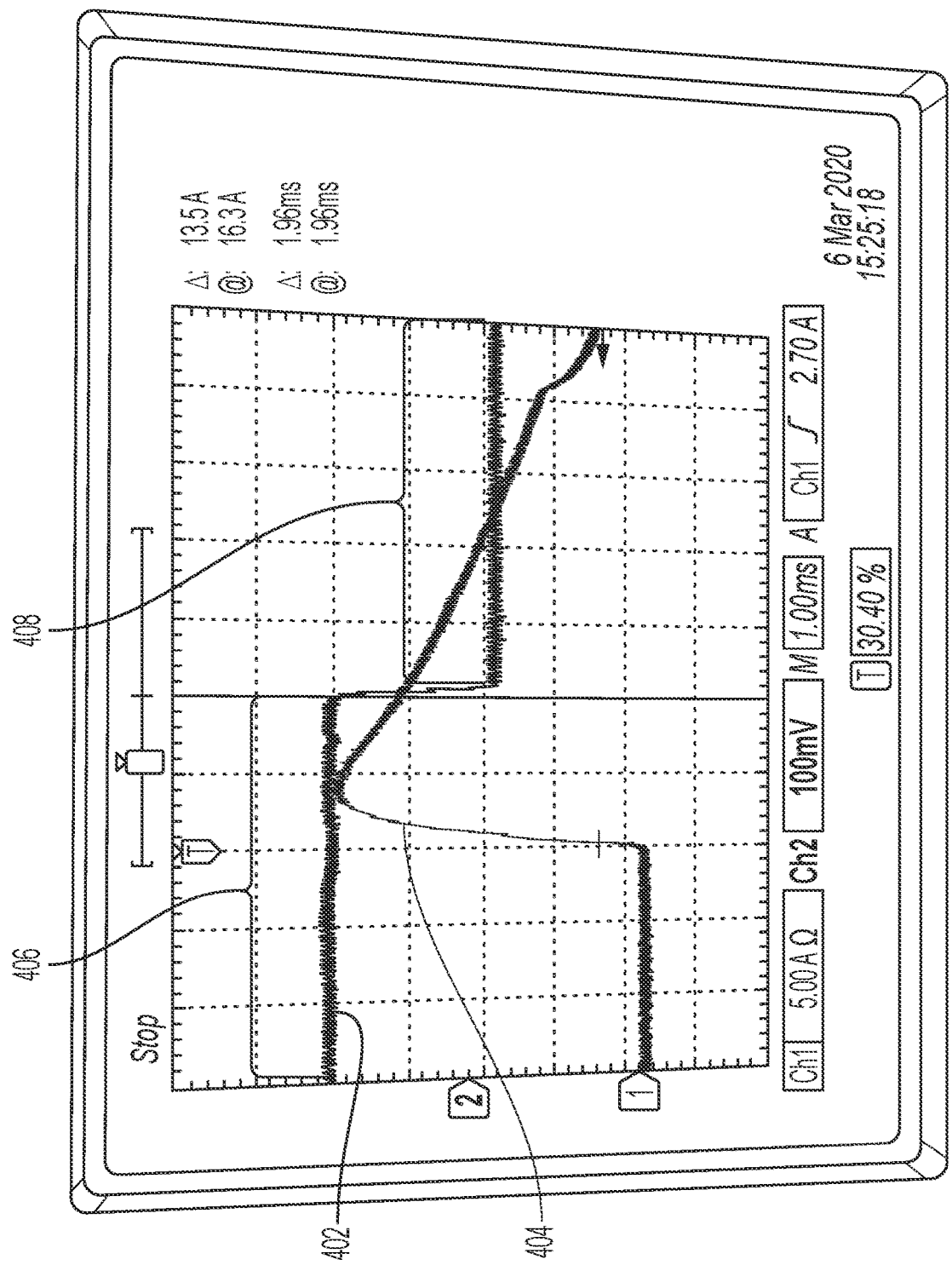
FIG. 4 illustrates a plot of the actual data showing blocking time for the mirror blocking an optical pulse in accordance with one or more embodiments of the invention.

FIG. 4 illustrates a plot of the actual data showing 1.96 mSec blocking time for the mirror blocking an optical pulse in accordance with one or more embodiments of the invention. The optical gate (V) 402 and coil current (A) 404 indicates the transition from the light being unblocked 406 to when the light has been blocked 408 and reflected. The time to block 406 is approximately 1.96 ms. Accordingly, the data indicates that embodiments of the invention satisfy specifications: with a 240V voltage pulse, the payload is able to travel 6 mm in 1.96 ms and block an optical pulse. Thus, the plot of FIG. 4 reflects the ability to achieve a desired shutter speed performance. Further, as described above, embodiments of the invention do not utilize a moving coil requiring electrical attachment. As a result, such embodiments avoid the failure mode associated with wire fatigue caused by repeated flexure of coil attachment wires.

Logical Flow

Figure 5:
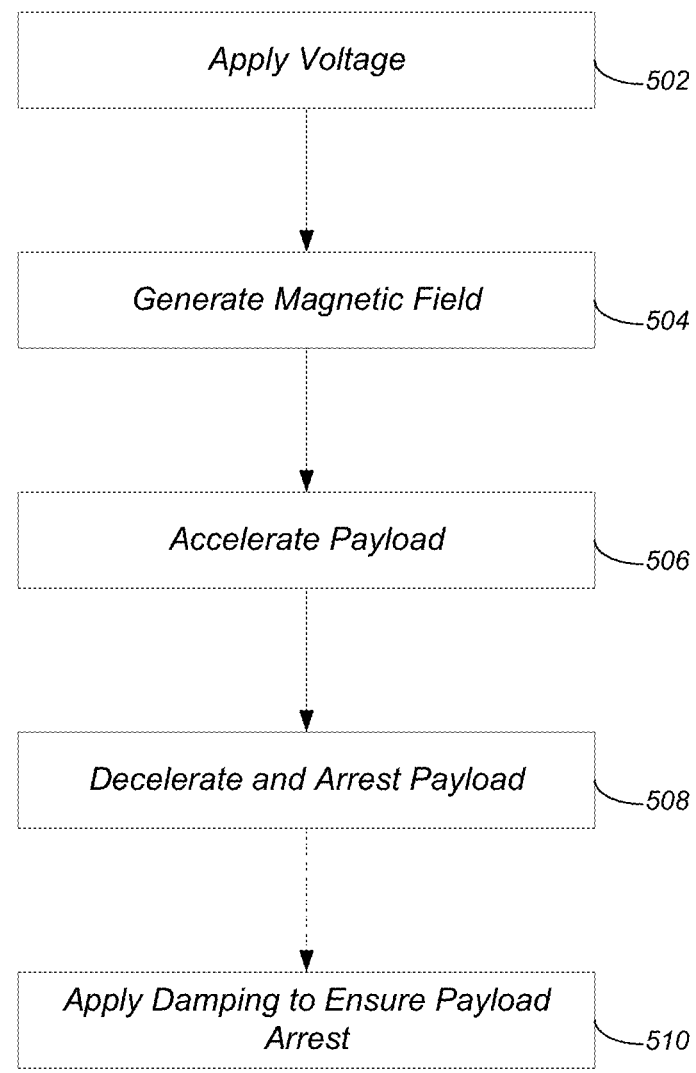
FIG. 5 illustrates the logical flow for blocking an optical pulse in accordance with one or more embodiments of the invention.

FIG. 5 illustrates the logical flow for blocking an optical pulse in accordance with one or more embodiments of the invention.

At step 502, a voltage is applied to a coil assembly. The coil assembly consists of a body (e.g., a PEEK body) upon which electrically conducting wires (e.g., 32 AWG polyimide-insulated copper wire) are wound and a payload aperture through which a payload travels. The payload consists of a magnet (e.g., a rectangular NdFeB grade-52 magnet) that is affixed to a mirror.

At step 504, the application of the voltage causes a current through the coil assembly thereby generating a magnetic field resulting in a net upward force on the magnet.

At step 506, the net upward force on the magnet accelerates the payload to travel upward through the payload aperture for the mirror to block an optical pulse.

At step 508, a magnetization direction of the magnet and a magnetic field in an upper portion of the coil assembly generate a net deceleration force onto the magnet resulting in an arrest of the payload as the magnet travels through the payload aperture. In one or more embodiments, the net deceleration force is experienced as the magnet travels axially beyond a center point of the coil assembly.

At optional step 501, arrest of the payload at a (defined/desired/pre-determined) stopping position is ensured using a copper damping assembly that is coupled to the coil assembly. The copper damping assembly includes an extension of the payload aperture through which the payload travels, and further includes a copper damping element that imposes eddy current damping. Such a copper damping assembly reduces oscillations of the payload that could result in an unblocking of the optical pulse (after the first moment it is blocked and reflected) (i.e., eddy current damping provided by copper interacting with the payload magnets damps the oscillatory transient response of the payload).

The steps 502-510 operate such that the electromechanical device serves as an electro-mechanical shutter.

In addition, steps 502-510 may further include the affixation of the coil assembly to a coil form of a mounting foot that enables the system/device to be mounted to an object (to maintain/stabilize the relative position of the assembly).

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electro-mechanical device comprising:
   (a) a payload comprising a magnet that is affixed to a mirror; and
   (b) a coil assembly comprising a body upon which electrically conducting wires are wound and a payload aperture through which the payload travels, wherein:
      (i) when voltage is applied to the coil assembly, current through the coil assembly generates a magnetic field resulting in a net upward force on the magnet that accelerates the payload to travel upward through the payload aperture for the mirror to block an optical pulse; and
      (ii) as the magnet travels through the payload aperture, due to a magnetization direction of the magnet and a magnetic field in an upper portion of the coil assembly, the magnet experiences a net deceleration force that arrests the payload.

2. The electro-mechanical device of claim 1, wherein the net deceleration force is experienced as the magnet travels axially beyond a center point of the coil assembly.

3. The electro-mechanical device of claim 1, further comprising:
   (c) a copper damping assembly coupled to the coil assembly, wherein:
      (i) the copper damping assembly comprises an extension of the payload aperture through which the payload travels; and
      (ii) the copper damping assembly comprises a copper damping element that imposes eddy current damping to ensure arrest of the payload at a stopping position.

4. The electro-mechanical device of claim 3, wherein the copper damping assembly reduces oscillations of the payload that could result in an unblocking of the optical pulse.

5. The electro-mechanical device of claim 1, wherein:
   the body comprises a polyether ether ketone (PEEK) body;
   the electrically conducting wires comprise 32 AWG (American Wire Gauge) polyimide-insulated copper wire; and
   the magnet comprises a rectangular NdFeB (Neodymium iron boron or "neo") grade-52 magnet.

6. The electro-mechanical device of claim 1, wherein:
   the electro-mechanical device comprises an electro-mechanical shutter device.

7. The electro-mechanical device of claim 1, further comprising:
   a mounting foot to mount the electro-mechanical device to an object, wherein the mounting foot further comprises a coil form to which the coil assembly is affixed.

8. A method for blocking an optical pulse comprising:
   (a) applying a voltage to a coil assembly, wherein:
      (i) the coil assembly comprises a body upon which electrically conducting wires are wound and a payload aperture through which a payload travels; and
      (ii) the payload comprises a magnet that is affixed to a mirror;
   (b) the application of the voltage causing a current through the coil assembly generating a magnetic field resulting in a net upward force on the magnet;
   (c) the net upward force on the magnet accelerating the payload to travel upward through the payload aperture for the mirror to block an optical pulse; and
   (d) a magnetization direction of the magnet and a magnetic field in an upper portion of the coil assembly generating a net deceleration force onto the magnet resulting in an arrest of the payload as the magnet travels through the payload aperture.

9. The method of claim 8, wherein the net deceleration force is experienced as the magnet travels axially beyond a center point of the coil assembly.

10. The method of claim 9, further comprising:
    ensuring an arrest of the payload at a stopping position using a copper damping assembly that is coupled to the coil assembly, wherein:
       (i) the copper damping assembly comprises an extension of the payload aperture through which the payload travels; and
       (ii) the copper damping assembly comprises a copper damping element that imposes eddy current damping to ensure the arrest of the payload at a stopping position.

11. The method of claim 10, wherein the copper damping assembly reduces oscillations of the payload that could result in an unblocking of the optical pulse.

12. The method of claim 8, wherein:
    the body comprises a polyether ether ketone (PEEK) body;

the electrically conducting wires comprise 32 AWG (American Wire Gauge) polyimide-insulated copper wire; and the magnet comprises a rectangular NdFeB (Neodymium iron boron or "neo") grade-52 magnet.

13. The method of claim 1, wherein:

the method serves as a electro-mechanical shutter.

14. The method of claim 1, further comprising:

affixing the coil assembly to a coil form of a mounting foot;

mounting the mounting foot to an object.

* * * * *